(12) United States Patent
Osawa et al.

(10) Patent No.: US 10,908,042 B2
(45) Date of Patent: Feb. 2, 2021

(54) PRESSURE SENSOR DEVICE AND HYDRAULIC CONTROL APPARATUS

(71) Applicant: Nidec Tosok Corporation, Zama (JP)

(72) Inventors: Tomoka Osawa, Zama (JP); Hiroshi Shirai, Zama (JP); Toshiaki Nakamura, Zama (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 256 days.

(21) Appl. No.: 15/933,419

(22) Filed: Mar. 23, 2018

(65) Prior Publication Data

US 2018/0283972 A1 Oct. 4, 2018

(30) Foreign Application Priority Data

Mar. 31, 2017 (JP) .................. 2017-069450

(51) Int. Cl.
*G01L 19/00* (2006.01)
*G01L 19/14* (2006.01)
*G01L 15/00* (2006.01)
*F16H 61/02* (2006.01)

(52) U.S. Cl.
CPC .......... *G01L 19/0092* (2013.01); *G01L 15/00* (2013.01); *G01L 19/0061* (2013.01); *G01L 19/142* (2013.01); *G01L 19/143* (2013.01); *F16H 61/0206* (2013.01)

(58) Field of Classification Search
CPC . G01L 19/0092; G01L 19/142; G01L 9/0091; G01L 15/00; G01L 19/143; G01L 19/147; G01L 19/0061; G01L 19/0645; G01L 19/0023; G01L 19/144; F16H 61/0206; F16K 37/005; F15B 13/086; F15B 13/042; F15B 2211/6306
See application file for complete search history.

(56) References Cited

U.S. PATENT DOCUMENTS

| | | | |
|---|---|---|---|
| 7,559,247 B2 * | 7/2009 | Otsuka .................. | G01L 9/0055 361/283.4 |
| 2003/0230146 A1 | 12/2003 | Imai et al. | |
| 2005/0061080 A1 * | 3/2005 | Sasaki ................. | G01L 19/0654 73/754 |
| 2006/0164203 A1 * | 7/2006 | Mast ................... | G01L 19/0069 338/68 |
| 2015/0040674 A1 * | 2/2015 | Ishihara .............. | G01L 19/0636 73/724 |
| 2016/0282213 A1 * | 9/2016 | Tochigi ................. | G01L 27/007 |

FOREIGN PATENT DOCUMENTS

| | | |
|---|---|---|
| JP | 2001-271918 A | 10/2001 |
| JP | 2004-20216 A | 1/2004 |
| WO | 2010/058800 A1 | 5/2010 |

* cited by examiner

*Primary Examiner* — Randy W Gibson
*Assistant Examiner* — Gedeon M Kidanu
(74) *Attorney, Agent, or Firm* — Keating & Bennett

(57) ABSTRACT

A pressure sensor device includes a pressure sensor having a housing positioned on a center axis extending vertically, a sensing hole provided in a lower part of the housing, and an electrode unit provided in an upper part of the housing; and a connecting member having a contact spring that is pressed against the electrode unit of the pressure sensor. The electrode unit includes a first frame-shaped electrode having a frame-like shape that is rotationally symmetrical with respect to the center axis; and an annular first-surface portion on which the first frame-shaped electrode is placed.

17 Claims, 5 Drawing Sheets

PRESSURE SENSOR DEVICE AND HYDRAULIC CONTROL APPARATUS

CROSS REFERENCE TO RELATED APPLICATIONS

This application claims the benefit of priority to Japanese Patent Application No. 2017-069450 filed on Mar. 31, 2017. The entire contents of this application are hereby incorporated herein by reference.

BACKGROUND OF THE INVENTION

1. Field of the Invention

The present invention relates to a pressure sensor device and a hydraulic control apparatus.

2. Description of the Related Art

In known techniques, pressure sensors are electrically connected to one another with connectors and circuit boards.

An exemplary apparatus for electrically connecting pressure sensors to one another with a connector and a circuit board is disclosed by Japanese Unexamined Patent Application Publication No. 2004-20216.

To electrically connect pressure sensors to a circuit board after the pressure sensors are attached to an apparatus such as a hydraulic control apparatus, the pressure sensors need to be attached to the apparatus in predetermined orientations. Such a situation makes the manufacturing process troublesome.

An aspect of the present invention provides a pressure sensor device with which pressure sensors are easily electrically connectable to one another and are efficiently attachable to a separate apparatus.

SUMMARY OF THE INVENTION

According to an aspect of the present invention, there is provided a pressure sensor device that includes a pressure sensor having a housing positioned on a center axis extending vertically, a sensing hole provided in a lower part of the housing, and an electrode unit provided in an upper part of the housing; and a connecting member having a contact spring that is pressed against the electrode unit of the pressure sensor. The electrode unit includes a first frame-shaped electrode having a frame-like shape that is rotationally symmetrical with respect to the center axis; and an annular first-surface portion on which the first frame-shaped electrode is placed.

The above and other elements, features, steps, characteristics and advantages of the present invention will become more apparent from the following detailed description of the preferred embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Figure 1:
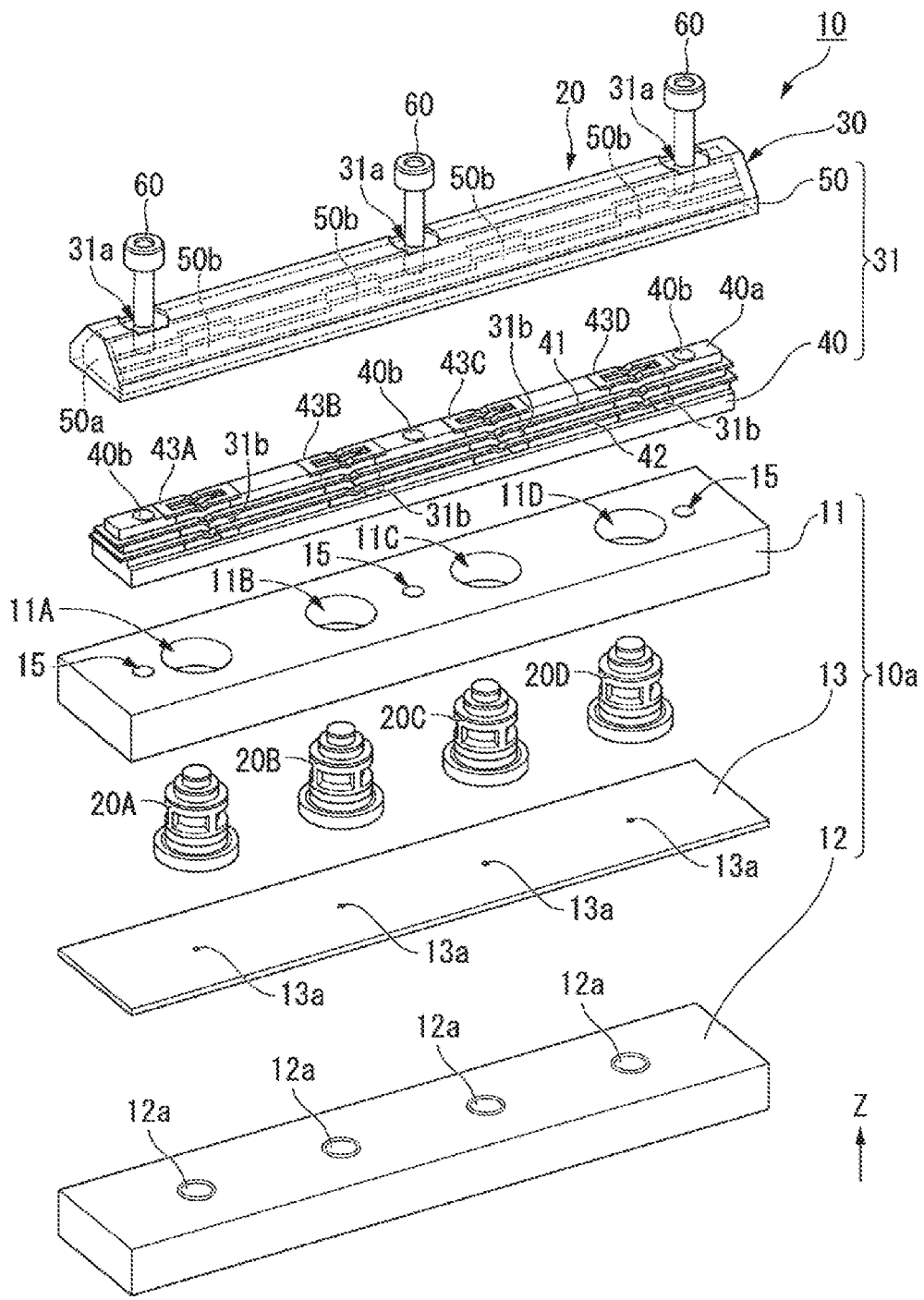
FIG. 1 is an exploded perspective view of a hydraulic control apparatus including a pressure sensor device according to an embodiment.

In the drawings, the Z-axis direction is defined as a vertical direction Z. The positive side in the vertical direction Z is referred to as "the upper side," and the negative side in the vertical direction Z is referred to as "the lower side." The terms "the upper side," "the lower side," and "the vertical direction" are only nominal for illustration of relative positions of individual elements and do not limit the actual arrangement and the like of such elements.

Figure 2:
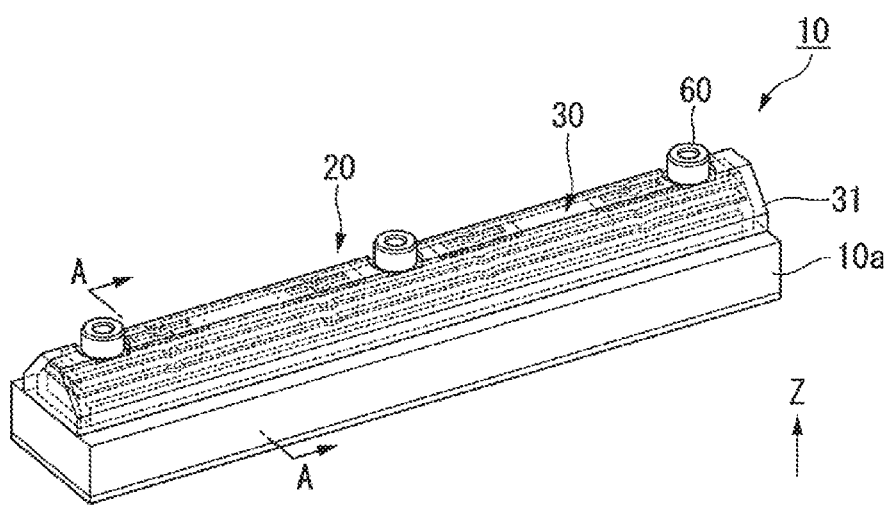
FIG. 2 is a perspective view of the hydraulic control apparatus according to the embodiment.
Figure 3:
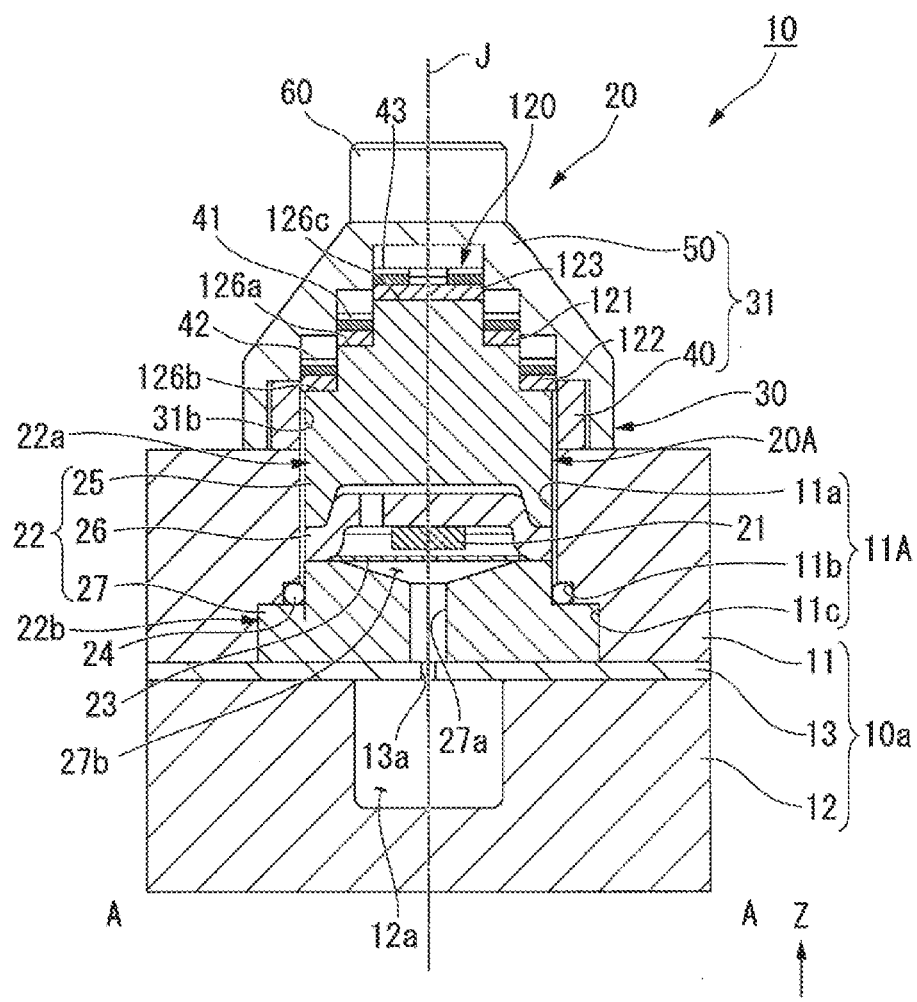
FIG. 3 is a sectional view taken along line A-A illustrated in FIG. 2.
Figure 4:
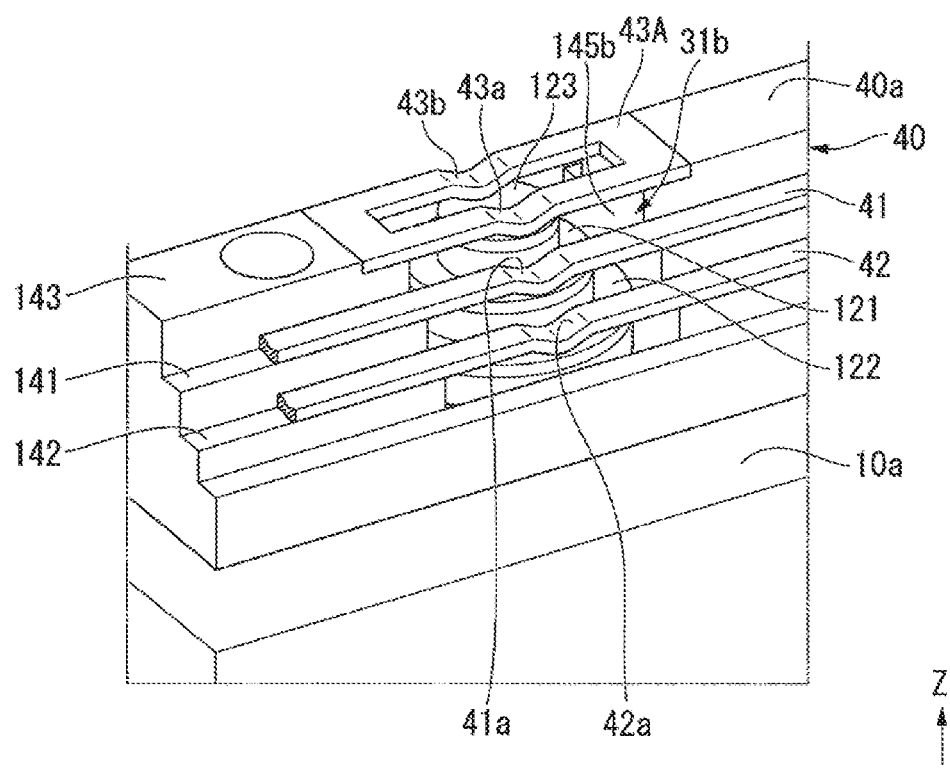
FIG. 4 is a perspective view illustrating an arrangement of an electrode unit and bus bars.
Figure 5:
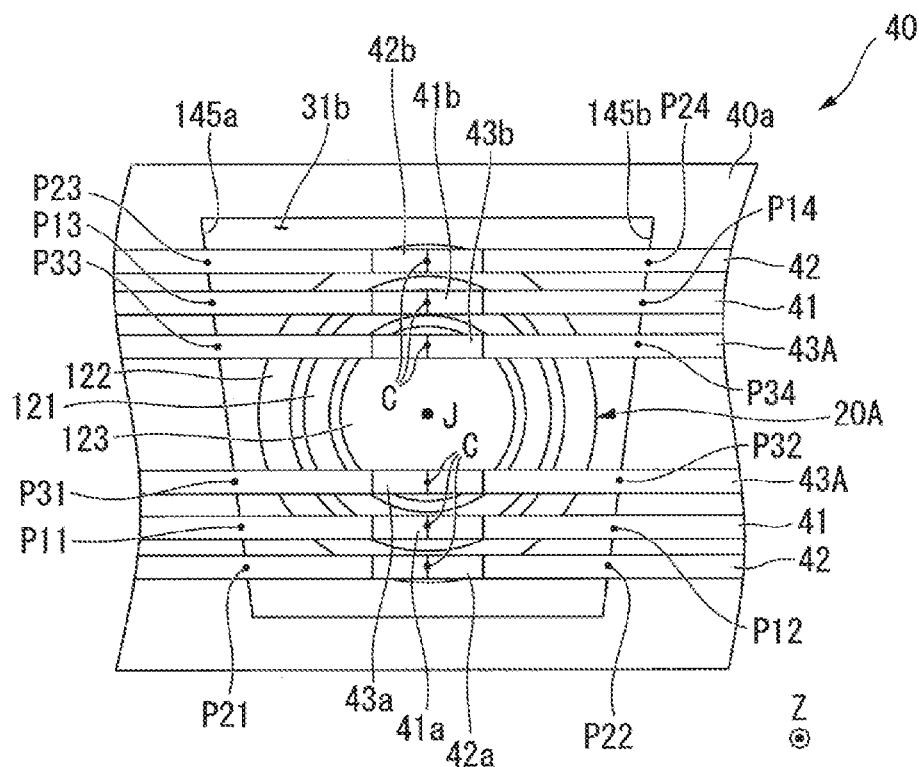
FIG. 5 is a plan view illustrating the arrangement of the electrode unit and the bus bars.

FIG. 1 is an exploded perspective view of a hydraulic control apparatus including a pressure sensor device according to an embodiment. FIG. 2 is a perspective view of the hydraulic control apparatus according to the embodiment. FIG. 3 is a sectional view taken along line A-A illustrated in FIG. 2. FIG. 4 is a perspective view illustrating an arrangement of an electrode unit and bus bars. FIG. 5 is a plan view illustrating the arrangement of the electrode unit and the bus bars.

A hydraulic control apparatus 10 according to the present embodiment illustrated in FIGS. 1 to 3 includes an oil-passage body 10a and a pressure sensor device 20.

The oil-passage body 10a has there inside oil passages 12a through which oil flows. The pressure sensor device 20 measures the pressure of the oil flowing through the oil passages 12a. The oil-passage body 10a includes an upper body 11, a lower body 12, and a separating plate 13. The upper body 11 and the lower body 12 are stacked with the separating plate 13 interposed therebetween and are fastened to each other with bolts (not illustrated).

The upper body 11 has four through holes 11A, 11B, 11C, and 11D each extending through the upper body 11 in the vertical direction Z, and three screw holes 15. The through holes 11A to 11D receive pressure sensors 20A to 20D fitted thereinto, respectively. The screw holes 15 receive bolts 60 screwed thereinto, respectively. In the present embodiment, the through holes 11A to 11D are each a circular hole having a center axis J extending in the vertical direction Z. Hereinafter, the radial direction with reference to the center axis J is simply referred to as "the radial direction," and the peripheral direction about the center axis J is simply referred to as "the peripheral direction."

Referring to FIG. 3, the through hole 11A includes, in order from the upper side, a first area 11a, a second area 11b, and a third area 11c having different inside diameters that increase in order of the inside diameter of the first area 11a, the inside diameter of the second area 11b, and the inside diameter of the third area 11c. The through holes 11B to 11D each have the same configuration as the through hole 11A.

When the hydraulic control apparatus 10 is assembled, the first area 11a receives a housing 22 of the pressure sensor 20A to be described below. The inside diameter of the first area 11a is substantially the same as the diameter of a columnar portion 22a of the housing 22.

The second area 11b is continuous with the lower end of the first area 11a. The second area 11b has a larger inside diameter than the first area 11a. The second area 11b is provided with an O ring 24 to be described.

The third area 11c is continuous with the lower end of the second area 11b. The third area 11c is at the bottom of the through hole 11A and is open to the lower side. The inside diameter of the third area 11c is substantially the same as the diameter of a flange portion 22b of the housing 22 to be described below.

A step 11d is provided between the second area 11b and the third area 11c and extends in the radial direction from the lower end of the second area 11b. The step 11d is an annular flat surface facing downward.

The lower body 12 has the oil passages 12a. The oil passages 12a illustrated in FIG. 1 each have a simple circular shape. Actually, the oil passages 12a are grooves that are provided in the upper surface of the lower body 12 and form a predetermined pattern. Some of the oil passages 12a may be provided in the upper body 11.

The separating plate 13 has a plurality of through holes 13a. Referring to FIG. 3, the through holes 13a are each provided at a position that is continuous with a sensing hole 27a provided in the pressure sensor 20A to be described below.

The pressure sensor device 20 includes the four pressure sensors 20A to 20D and a connecting member 30. In the present embodiment, as illustrated in FIGS. 1 and 3, the four pressure sensors 20A to 20D are fitted into the respective through holes 11A to 11D from the lower side of the upper body 11. The connecting member 30 is provided over portions of the pressure sensors 20A to 20D that are exposed from the upper surface of the upper body 11. The pressure sensors 20A to 20D all have the same configuration. The following description takes the pressure sensor 20A as a representative example.

Referring to FIG. 3, the pressure sensor 20A includes a sensor body 21, the housing 22 that houses the sensor body 21, the sensing hole 27a provided in a lower part of the housing 22, an electrode unit 120 provided at the top of the housing 22, and the O ring 24. The housing 22 is placed on the upper surface of the separating plate 13 while being fitted in the through hole 11A provided in the upper body 11.

The housing 22 includes the columnar portion 22a and the flange portion 22b.

The columnar portion 22a has a columnar shape extending in the vertical direction Z along the center axis J. The following description of relevant elements of the pressure sensor 20A is based on a case where the columnar portion 22a is centered on the center axis J. The flange portion 22b is provided at the lower end of the columnar portion 22a and has an annular shape extending radially outward from the lower end of the columnar portion 22a. The O ring 24 is provided at a position where the outer peripheral surface of the columnar portion 22a meets the upper surface of the flange portion 22b. The O ring 24 encircles the columnar portion 22a in the peripheral direction.

Referring to FIGS. 1 and 3, the housing 22 is fitted in the through hole 11A. The columnar portion 22a of the housing 22 is fitted in the first area 11a of the through hole 11A. An upper part of the columnar portion 22a projects upward from the upper surface of the upper body 11. The flange portion 22b is fitted in the third area 11c of the through hole 11A. The upper surface of the flange portion 22b is in contact with the step 11d in the through hole 11A from the lower side. The flange portion 22b prevents the housing 22 from moving upward. The O ring 24 is fitted in the second area 11b of the through hole 11A. The O ring 24 is held between the outer peripheral surface of the columnar portion 22a and the inner peripheral surface of the second area 11b, thereby being compressed in the radial direction. The O ring 24 seals in the oil. Since the O ring 24 is compressed in the radial direction, the sealing by the O ring 24 is effective even if the pressure sensor 20A vibrates in the vertical direction Z.

The housing 22 includes an upper case 25, a lid portion 26, and a lower case 27. The upper case 25 forms the upper part of the columnar portion 22a. The upper case 25 is, for example, a single member made of resin. The lower case 27 forms a lower part of the columnar portion 22a. The flange portion 22b is included in the lower case 27. The lower case 27 is, for example, a single member made of metal. The lid portion 26 is in contact with and held between the upper case 25 and the lower case 27 in the vertical direction Z.

A housing space 27b is provided between the lower case 27 and the lid portion 26 in the vertical direction Z. The housing space 27b is separated into upper and lower parts in the vertical direction Z by a diaphragm 23. The sensing hole 27a extends downward in the vertical direction Z from the bottom of the housing space 27b. The sensing hole 27a has an opening in the lower surface of the lower case 27. The sensor body 21 is positioned in the upper part of the housing space 27b and attached to the lower surface of the lid portion 26. The upper part of the housing space 27b is filled with a pressure-transmitting liquid. In the hydraulic control apparatus 10, the housing space 27b is connected to the oil passage 12a via the sensing hole 27a and the through hole 13a provided in the separating plate 13. When the hydraulic control apparatus 10 is in use, the oil in the oil passage 12a flows into the lower part of the housing space 27b via the sensing hole 27a. The pressure of the oil thus flowed into the lower part of the housing space 27b is applied to the sensor body 21 through the diaphragm 23 and the pressure-transmitting liquid. Thus, the hydraulic pressure of the oil in the oil passage 12a can be measured with the sensor body 21.

The upper case 25 includes the electrode unit 120 at the upper end thereof. The electrode unit 120 includes an annular first-surface portion 126a, an annular second-surface portion 126b, and a third surface portion 126c that are formed of respective portions of the upper surface of the upper case 25. The electrode unit 120 further includes a first frame-shaped electrode 121, a second frame-shaped electrode 122, and a center electrode 123.

An upper part of the upper case 25 has a three-step structure with a central part thereof projecting upward. The third surface portion 126c is provided at the top of the upper case 25. The third surface portion 126c has a circular shape centered on the center axis J. The annular first-surface portion 126a having an annular shape centered on the center axis J in such a manner as to encircle the third surface portion 126c is positioned on the radially outer side and the lower side of the third surface portion 126c. The annular second-surface portion 126b having an annular shape centered on the center axis J in such a manner as to encircle the annular first-surface portion 126a is positioned on the radially outer side and the lower side of the annular first-surface portion 126a.

The first frame-shaped electrode 121 having an annular shape centered on the center axis J is provided on the annular first-surface portion 126a. The second frame-shaped electrode 122 having an annular shape centered on the center axis J is provided on the annular second-surface portion 126b. The center electrode 123 having a circular shape centered on the center axis J is provided on the third surface portion 126c. In the vertical direction Z, the center electrode 123 is provided on the top step, the first frame-shaped electrode 121 is provided on the middle step, and the second frame-shaped electrode 122 is provided on the bottom step. The first frame-shaped electrode 121, the second frame-shaped electrode 122, and the center electrode 123 each have a flat shape that is rotationally symmetrical with respect to the center axis J.

The first frame-shaped electrode 121, the second frame-shaped electrode 122, and the center electrode 123 are electrically connected to the sensor body 21 with wiring lines (not illustrated). For example, the first frame-shaped electrode 121 is a power terminal, the second frame-shaped electrode 122 is a ground terminal, and the center electrode 123 is a signal terminal.

Referring to FIGS. 1 and 2, the connecting member 30 is a stick-like member extending in the direction in which the pressure sensors 20A to 20D are aligned. The connecting member 30 includes a stick-like frame member 31, and a plurality of bus bars 41, 42, and 43A to 43D that are housed in the frame member 31.

The frame member 31 has three through holes 31a extending through the frame member 31 in the vertical direction Z. The frame member 31 is fastened to the oil-passage body 10a with the bolts 60. The bolts 60 are inserted into the respective through holes 31a from the upper side and are screwed into the respective screw holes 15 provided in the upper body 11. The parts of the frame member 31 having the through holes 31a are regarded as attaching parts where the connecting member 30 is fixed to the oil-passage body 10a. Hence, in the present embodiment, the connecting member 30 serves as a wiring component provided for the pressure sensors 20A to 20D of the pressure sensor device 20 and also serves as a connecting bracket with which the pressure sensor device 20 is connectable to a separate apparatus. The hydraulic control apparatus 10 having such a configuration can be assembled efficiently.

The frame member 31 includes a long narrow plate-like lower frame 40, and an upper frame 50 that covers the lower frame 40 from the upper side.

The lower frame 40 includes a body portion 40a, three through holes 40b, and four pressure-sensor-holding portions 31b. The through holes 40b each form a part of a corresponding one of the through holes 31a provided in the frame member 31. The pressure-sensor-holding portions 31b are each a through hole extending through the lower frame 40 in the vertical direction Z. In a state where the upper frame 50 is attached to the lower frame 40, the pressure-sensor-holding portions 31b form recesses that receive the upper parts of the respective pressure sensors 20A to 20D.

The upper surface of the body portion 40a has a three-step structure with a central part thereof projecting upward. Referring to FIG. 4, the body portion 40a includes a top step 143 at the top thereof, middle steps 141 in the middle thereof, and bottom steps 142 at the bottom thereof. The top step 143 is positioned in the center of the upper surface of the body portion 40a in the widthwise direction (the short-side direction of the plate-like body portion 40a). The middle steps 141 are positioned on both sides of the top step 143 in the widthwise direction and on the lower side of the top step 143 in the vertical direction Z. The bottom steps 142 are positioned on both sides of the middle steps 141 in the widthwise direction and on the lower side of the middle steps 141 in the vertical direction Z.

The bus bar 41, which has a rectangular frame-like shape when seen from above, is placed over the middle steps 141 of the body portion 40a. The bus bar 42, which has a rectangular frame-like shape when seen from above, is placed over the bottom steps 142. The four bus bars 43A, 43B, 43C, and 43D are placed on the top step 143 and over the four respective pressure-sensor-holding portions 31b. The bus bars 41 and 42 connect the four pressure-sensor-holding portions 31b to one another. The bus bars 41 and 42 are each suitable as, for example, a power line or a ground line. The bus bars 43A to 43D are provided for the respective pressure-sensor-holding portions 31b and are therefore suitable as signal output lines for the pressure sensors 20A to 20D.

Referring to FIG. 1, the upper frame 50 has a housing portion 50a provided in the form of a recess that is open on the lower side. The housing portion 50a houses the lower frame 40 and the bus bars 41, 42, and 43A to 43D. The inner surface of the housing portion 50a has a stepped shape that fits the upper surface of the lower frame 40. The bus bars 41, 42, and 43A to 43D are each held between the upper frame 50 and the lower frame 40, thereby being fixed. The housing portion 50a of the upper frame 50 includes recesses 50b at positions that face the respective pressure-sensor-holding portions 31b of the lower frame 40 in the vertical direction Z. The recesses 50b are depressed in the vertical direction Z from the inner surface of the housing portion 50a. Portions of the bus bars 41, 42, and 43A to 43D that extend within the pressure-sensor-holding portions 31b and the recesses 50b are not fixed to the frame member 31 and are elastically deformable. The elastically deformable portions of the bus bars 41, 42, and 43A to 43D serve as contact springs that are in contact with the electrodes 121 to 123 of the pressure sensors 20A to 20D.

Referring to FIGS. 4 and 5, the bus bar 41 has contact springs 41a and 41b at each of four positions in the four pressure-sensor-holding portions 31b. The bus bar 42 has contact springs 42a and 42b at each of four positions in the four pressure-sensor-holding portions 31b. The bus bars 43A to 43D each have contact springs 43a and 43b in a corresponding one of the four pressure-sensor-holding portions 31b. When seen from above, the contact springs 41a, 41b, 42a, 42b, 43a, and 43b are bent downward in the vertical direction Z at the respective positions overlapping the pressure sensors 20A to 20D. The lowest point of each of the contact springs 41a, 41b, 42a, 42b, 43a, and 43b serves as a contact point C thereof.

The connecting member 30 is fixed to the pressure sensors 20A to 20D fitted in the oil-passage body 10a. Specifically, the upper parts of the pressure sensors 20A to 20D projecting from the upper surface of the upper body 11 are fitted in the respective pressure-sensor-holding portions 31b, which are recesses that are open on the lower side of the connecting member 30. Thus, the first frame-shaped electrode 121 of each of the pressure sensors 20A to 20D is in contact with the contact springs 41a and 41b, the second frame-shaped electrode 122 is in contact with the contact springs 42a and 42b, and the center electrode 123 is in contact with the contact springs 43a and 43b in a corresponding one of the pressure-sensor-holding portions 31b.

With the connecting member 30 provided over the pressure sensors 20A to 20D, an assembling worker screws in the three bolts 60, whereby the contact springs 41a, 41b, 42a, 42b, 43a, and 43b are pressed by the pressure sensors 20A to 20D and are elastically deformed. That is, the contact springs 41a, 41b, 42a, 42b, 43a, and 43b and the electrodes 121 to 123 are pressed against each other. In the pressure sensor device 20 according to the present embodiment, the plurality of pressure sensors 20A to 20D can be held by one connecting member 30 and can be wired with the connecting member 30.

In the present embodiment, the pressure sensors 20A to 20D are pressed from the upper side with the spring forces exerted by the contact springs 41a, 41b, 42a, 42b, 43a, and 43b. Thus, the bringing of the electrode unit 120 into contact with the contact points C and the fixing of the pressure sensors 20A to 20D are realized with a simple configuration employing the contact springs 41a, 41b, 42a, 42b, 43a, and 43b.

Referring to FIG. 5, the contact springs 41a and 41b are pressed against the upper surface of the first frame-shaped electrode 121. Specifically, referring to FIG. 4, the upper surface of the first frame-shaped electrode 121 presses the contact springs 41a and 41b from the lower side, whereby the contact springs 41a and 41b are elastically deformed upward. That is, the elastic forces exerted by the contact springs 41a and 41b cause the respective contact points C to be pressed against the first frame-shaped electrode 121.

When seen from above, the contact springs 41a and 41b extend parallel to each other on two respective sides of the center axis J. When seen from above, the contact points C of the respective contact springs 41a and 41b are positioned on a virtual straight line passing through the center axis J and are at the same distance from the center axis J. That is, the contact points C of the respective contact springs 41a and 41b are arranged in point symmetry with respect to the center axis J.

With such a configuration, even if the pressure sensor 20A is rotated about the center axis J, the contact points C of the contact springs 41a and 41b can be kept in contact with the first frame-shaped electrode 121, which has a rotationally symmetrical shape with respect to the center axis J. In particular, the first frame-shaped electrode 121 according to the present embodiment has an annular shape. Therefore, even if the pressure sensor 20A is rotated by an arbitrary angle, the contact springs 41a and 41b can be kept in contact with the first frame-shaped electrode 121. Hence, the hydraulic control apparatus 10 is easier to assemble and thus provides higher efficiency in the assembling work than an apparatus in which pressure sensors need to be attached to an oil-passage body while the orientations of the pressure sensors are fixed.

The contact springs 41a and 41b according to the present embodiment are each a part of the rectangular frame-shaped bus bar 41. Therefore, the contact springs 41a and 41b are electrically connected to each other and have the same potential. That is, the connecting member 30 includes a plurality of contact springs 41a and 41b that are in contact with a single first frame-shaped electrode 121 of the electrode unit 120. Hence, even if the pressure sensor 20A vibrates in the vertical direction Z with changes in the oil pressure in the oil passage 12a, there is high probability that at least one of the two contact points C that are pressed against the first frame-shaped electrode 121 can be kept in contact with the first frame-shaped electrode 121. Thus, it becomes easier to keep the first frame-shaped electrode 121 in contact with the contact springs 41a and 41b, and the occurrence of noise in the power line and the insufficiency of the signal intensity can be suppressed.

Referring to FIG. 5, the elastically deformable parts of the contact spring 41a and the contact spring 42a according to the present embodiment are different. Specifically, a sidewall 145a and a sidewall 145b of the pressure-sensor-holding portion 31b are tilted with respect to the widthwise direction of the lower frame 40. That is, the distance between the sidewall 145a and the sidewall 145b gradually increases toward one side in the widthwise direction of the pressure-sensor-holding portion 31b. Therefore, the length of the elastically deformable part of the contact spring 41a (the length between supporting points P11 and P12) and the length of the elastically deformable part of the contact spring 41b (the length between supporting points P13 and P14) are different. With such a configuration, the resonance frequency of the contact spring 41a and the resonance frequency of the contact spring 41b can be made different. Thus, the two contact springs 41a and 41b that are pressed against the first frame-shaped electrode 121 are prevented from resonating simultaneously. Consequently, the contact springs 41a and 41b can be more assuredly kept in contact with the first frame-shaped electrode 121.

Referring to FIG. 5, the contact springs 42a and 42b are pressed against the upper surface of the second frame-shaped electrode 122. Since the upper surface of the second frame-shaped electrode 122 presses the contact springs 42a and 42b from the lower side, the contact springs 42a and 42b are elastically deformed upward. That is, the elastic forces exerted by the contact springs 42a and 42b cause the respective contact points C to be pressed against the second frame-shaped electrode 122.

When seen from above, the contact springs 42a and 42b extend parallel to each other on two respective sides of the center axis J. When seen from above, the contact points C of the respective contact springs 42a and 42b are arranged in point symmetry with respect to the center axis J. The contact springs 42a and 42b are each a part of the rectangular frame-shaped bus bar 42. Therefore, the contact springs 42a and 42b are electrically connected to each other and have the same potential. Furthermore, the length of the elastically deformable part of the contact spring 42a (the length between supporting points P21 and P22) and the length of the elastically deformable part of the contact spring 42b (the length between supporting points P23 and P24) are different.

The contact springs 42a and 42b configured as above produce the same advantageous effects produced by the contact springs 41a and 41b described above.

The shapes of the first frame-shaped electrode 121 and the second frame-shaped electrode 122 are each not limited to an annular shape, as long as the first frame-shaped electrode 121 and the second frame-shaped electrode 122 each have a rotationally symmetrical shape with respect to the center axis J. For example, the first frame-shaped electrode 121 or the second frame-shaped electrode 122 may have a regular polygonal shape centered on the center axis J. Moreover, the first frame-shaped electrode 121 or the second frame-shaped electrode 122 may be divided in the peripheral direction into a plurality of electrodes.

Referring to FIG. 5, the contact springs 43a and 43b are pressed against the upper surface of the center electrode 123. Since the upper surface of the center electrode 123 presses the contact springs 43a and 43b from the lower side, the contact springs 43a and 43b are elastically deformed upward. That is, the elastic forces exerted by the contact springs 43a and 43b cause the respective contact points C to be pressed against the center electrode 123.

When seen from above, the contact springs 43a and 43b extend parallel to each other on two respective sides of the center axis J. The contact points C of the respective contact springs 43a and 43b are arranged in point symmetry with respect to the center axis J. The center electrode 123 has a circular shape centered on the center axis J and that is rotationally symmetrical with respect to the center axis J. With such a configuration, even if the pressure sensor 20A is rotated about the center axis J, the contact points C of the contact springs 43a and 43b can be kept in contact with the center electrode 123. Hence, the hydraulic control apparatus 10 is easier to assemble and thus provides higher efficiency in the assembling work than an apparatus in which pressure sensors need to be attached to an oil-passage body while the orientations of the pressure sensors are fixed.

The shape of the center electrode 123 is not limited to a circular shape and may be any shape, as long as the center electrode 123 can be kept in contact with the contact springs 43a and 43b even if a corresponding one of the pressure sensors 20A to 20D is rotated. For example, the center electrode 123 may have a regular polygonal shape. If the center axis J is positioned within the plane of the center electrode 123, the center electrode 123 may have any shape but a shape centered on the center axis J and containing a circle whose radius is equal to the distance from the center axis J to each of the contact points C of the contact springs 43a and 43b.

Moreover, the center electrode 123 may have an annular shape centered on the center axis J. For example, the center electrode 123 may be an annular electrode or a polygonal annular electrode. If the center electrode 123 has an annular shape, the inner periphery and the outer periphery of the center electrode 123 may have any shapes, as long as the center electrode 123 contains an annular area through which the contact points C of the contact springs 43a and 43b pass when a corresponding one of the pressure sensors 20A to 20D are rotated.

The contact springs 43a and 43b illustrated in FIG. 5 are parts of the rectangular frame-shaped bus bar 43A. Therefore, the contact springs 43a and 43b are electrically connected to each other and have the same potential. That is, two contact springs 43a and 43b are in contact with the center electrode 123. Accordingly, the center electrode 123 can be assuredly kept in contact with either of the contact springs 43a and 43b, and the occurrence of noise in the power line and the insufficiency of the signal intensity can be suppressed.

Furthermore, the length of the elastically deformable part of the contact spring 43a (the length between supporting points P31 and P32) and the length of the elastically deformable part of the contact spring 43b (the length between supporting points P33 and P34) are different. Hence, the contact springs 43a and 43b are prevented from resonating simultaneously. Consequently, the contact springs 43a and 43b can be assuredly kept in contact with the center electrode 123.

The first frame-shaped electrode 121, the second frame-shaped electrode 122, and the center electrode 123 according to the present embodiment are at different positions in the vertical direction Z. Accordingly, the contact springs 41a and 41b connected to the first frame-shaped electrode 121, the contact springs 42a and 42b connected to the second frame-shaped electrode 122, and the contact springs 43a and 43b connected to the center electrode 123 are also at different positions in the vertical direction Z. Therefore, the distance between adjacent ones of the contact springs can be increased, making it easier to arrange the contact springs. Moreover, such an arrangement of the contact springs are less likely to cause short circuits.

Note that two or three of the first frame-shaped electrode 121, the second frame-shaped electrode 122, and the center electrode 123 may be provided at the same position in the vertical direction Z.

While the above embodiment employs a configuration in which a plurality of contact springs are provided for each of the electrodes of the electrode unit 120, another configuration may be employed in which a single contact spring is in contact with a single electrode. For example, the contact spring 42a may be omitted, so that only one contact spring 41a is contact with the first frame-shaped electrode 121. In such a configuration, as long as the first frame-shaped electrode 121 has a rotationally symmetrical shape, the contact spring 41a can be kept in contact with the first frame-shaped electrode 121 even if a corresponding one of the pressure sensors 20A to 20D is rotated by an arbitrary angle. Therefore, the efficiency in the work of assembling the hydraulic control apparatus 10 can be increased.

The present invention is not limited to the above embodiment and may employ another configuration.

For example, while the above embodiment employs a configuration in which the pressure sensors 20A to 20D are fitted into the through holes 11A to 11D from the lower side of the upper body 11 and are each prevented from coming off by the flange portion 22b, another configuration may be employed in which the pressure sensors 20A to 20D are mounted on the upper surface of the upper body 11. In such a case, the upper surface of the upper body 11 is provided with oil-passage openings that communicate with the oil passages 12a, and the sensing holes 27a of the respective pressure sensors 20A to 20D are connected to the respective oil-passage openings. Furthermore, the pressure sensors 20A to 20D are fixed to the oil-passage body 10a by a fixing member that presses the flange portions 22b from the upper side. The fixing member may be a plate member having through holes into which the columnar portions 22a of the pressure sensors 20A to 20D are fittable, respectively, and at which the flange portions 22b are stopped. The fixing member is fastened to the oil-passage body 10a with bolts. Alternatively, the fixing member and the connecting member 30 may be fastened to each other with the bolts 60.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A pressure sensor device comprising:
a pressure sensor including a housing positioned on a center axis extending vertically, a sensing hole provided in a lower portion of the housing, and an electrode unit provided in an upper portion of the housing; and
a connecting member having a contact spring that is pressed against the electrode unit of the pressure sensor, wherein
the electrode unit includes:
a first frame-shaped electrode which has a frame shape and includes a central hole, the first frame-shaped electrode is rotationally symmetric with respect to the center axis; and
an annular first-surface portion on which the first frame-shaped electrode is placed;
the first frame-shaped electrode has an annular shape;
the electrode unit includes a second frame-shaped electrode which has a frame shape and includes a central hole, the second frame-shaped electrode is rotationally symmetric with respect to the center axis; and
the second frame-shaped electrode is placed on an annular second-surface portion provided on a radially outer side of the first frame-shaped electrode.

2. The pressure sensor device according to claim 1, wherein the first frame-shaped electrode is positioned above the second frame-shaped electrode.

3. The pressure sensor device according to claim 2, wherein the second frame-shaped electrode has an annular shape.

4. The pressure sensor device according to claim 1, wherein the electrode unit includes a center surface portion on a radially inner side of the first frame-shaped electrode and on which a center electrode is placed.

5. The pressure sensor device according to claim 4, wherein the center electrode is positioned above the first frame-shaped electrode.

6. The pressure sensor device according to claim 5, wherein the center electrode has a rotationally symmetric shape with respect to the center axis.

7. The pressure sensor device according to claim 6, wherein the center electrode has an island shape or an annular shape when seen in an axial direction.

8. The pressure sensor device according to claim 1, wherein the contact spring of the connecting member is one of a plurality of contact springs that are in contact with a single electrode of the electrode unit.

9. The pressure sensor device according to claim 8, wherein
the plurality of contact springs are leaf springs including respective elastically deformable portions having different lengths, and
the plurality of contact springs are in contact with different positions of the single electrode.

10. The pressure sensor device according to claim 9, wherein the connecting member includes:
a pressure-sensor-holding portion that presses the pressure sensor from an upper side; and
an attaching portion to be fixed to an apparatus in which the pressure sensor is to be provided.

11. The pressure sensor device according to claim 10, wherein the contact spring is placed in the pressure-sensor-holding portion, with the pressure sensor being pressed from an upper side with a spring force exerted by the contact spring.

12. The pressure sensor device according to claim 11, wherein
the connecting member includes a plurality of bus bars and a frame member that holds the bus bars,
the pressure sensor is one of a plurality of pressure sensors,
the pressure-sensor-holding portion is one of a plurality of pressure-sensor-holding portions included in the frame member, the pressure-sensor-holding portions being a plurality of recesses in each of which an upper portion of a corresponding one of the pressure sensors is fitted, and
a portion of each of the bus bars is exposed in a corresponding one of the recesses, and the exposed portion of each of the bus bars serves as the contact spring.

13. The pressure sensor device according to claim 8, wherein the connecting member includes two bus bars extending parallel to each other on two respective sides of the center axis when seen from above, and the two bus bars include the respective contact springs provided at respective positions that are in point symmetry with respect to the center axis.

14. The pressure sensor device according to claim 13, wherein the two bus bars are electrically connected to each other and have the same potential.

15. A hydraulic control apparatus comprising the pressure sensor device according to claim 14.

16. The hydraulic control apparatus according to claim 15, further comprising:
a lower body; and
an upper body stacked on an upper side of the lower body, wherein
the upper body includes a through hole extending vertically through the upper body,
the pressure sensor is placed on an upper surface of the lower body and is fitted in the through hole of the upper body, and
the connecting member is placed on the electrode unit of the pressure sensor that is exposed to an outside of the upper body.

17. The hydraulic control apparatus according to claim 15, further comprising:
an oil-passage body having an oil passage inside the oil-passage body; and
a fixing member that fixes the pressure sensor to the oil-passage body, wherein
the oil-passage body includes an oil-passage opening provided in an upper surface and communicating with the oil passage,
the pressure sensor is placed on an upper surface of the oil-passage body, and the sensing hole of the pressure sensor is connected to the oil-passage opening, and
the fixing member presses the pressure sensor from an upper side and fixes the pressure sensor to the oil-passage body.

* * * * *